(12) United States Patent
Markman et al.

(10) Patent No.: US 7,849,380 B2
(45) Date of Patent: Dec. 7, 2010

(54) INTERLEAVER MODE DETECTION IN A DIGITAL VIDEO RECEIVER

(75) Inventors: Ivonete Markman, Carmel, IN (US); Weixiao Liu, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1062 days.

(21) Appl. No.: 11/579,968

(22) PCT Filed: Jan. 24, 2005

(86) PCT No.: PCT/US2005/002216

§ 371 (c)(1),
(2), (4) Date: Nov. 10, 2006

(87) PCT Pub. No.: WO2005/115010

PCT Pub. Date: Dec. 1, 2005

(65) Prior Publication Data

US 2008/0034271 A1 Feb. 7, 2008

Related U.S. Application Data

(60) Provisional application No. 60/570,603, filed on May 13, 2004.

(51) Int. Cl.
 H03M 13/00 (2006.01)
(52) U.S. Cl. .................. 714/760; 714/762; 714/788
(58) Field of Classification Search .............. 714/760, 714/762, 788
See application file for complete search history.

(56) References Cited

U.S. PATENT DOCUMENTS 5,666,170 A 9/1997 Stewart
5,757,416 A 5/1998 Birch et al.
6,570,928 B1 5/2003 Shibata
6,707,859 B1 3/2004 Kinnunen et al.
6,914,637 B1 * 7/2005 Wolf et al. .................. 348/473

FOREIGN PATENT DOCUMENTS

EP 1 061 746 A1 12/2000
JP 06-162377 A 6/1994
JP 2003224545 A 8/2003

OTHER PUBLICATIONS

"Digital Video Transmission Standard for Cable Television" Document Society of Cable Telecommunications Engineers, Jul. 2000, XP-002260516.

(Continued)

Primary Examiner—Guy J Lamarre
(74) Attorney, Agent, or Firm—Robert D. Shedd; Harvey D. Fried; Joel M. Fogelson

(57) ABSTRACT

A method and apparatus for decoding received digital data representing video, audio, information or a combination thereof. After a forward error correction (FEC) frame sync lock is detected, a counter is incremented corresponding to the number of identical control words decoded from the received data. If the number of identical control words is above a threshold value, the control word is used to operate the decoder in a mode corresponding to the control word. Otherwise, the system repeats the operation of determining whether a FEC frame sync lock is detected.

17 Claims, 4 Drawing Sheets

OTHER PUBLICATIONS

W. Keck, "A Method for Robust Decoding of Erroneous MPEG-2 Video Bitstreams" IEEE Transactions on Consumer Electronics, IEEE Inc., New York, pp. 411-421, XP000638521.

V. I. Levenshtein, "Efficient Reconstruction of Sequences", IEEE Transactions on Information Theory IEEE, XP002326857.

ITU International Telecommunication Union, Digital Multi-Programme Systems for Television, Sound and Data Services for Cable Distribution.

European Search Report.

* cited by examiner

INTERLEAVER MODE DETECTION IN A DIGITAL VIDEO RECEIVER

This application claims the benefit, under 35 U.S.C. §365 of International Application PCT/US2005/002216, filed Jan. 24, 2005 which was published in accordance with PCT Article 21(2) on Dec. 1, 2005 in English and which claims the benefit of U.S. provisional patent application No. 60/570,603 filed May 13, 2004.

BACKGROUND OF THE INVENTION

1. Field of the Invention

The present invention generally relates to the transmission and reception of a digital signal, and, more particularly, to a receiver that identifies the interleaver mode of the received digital signal.

2. Background of the Invention

For the transmission and reception of a digital signal containing video, sound, data services, and the like, exemplary standards such as *Digital Video Transmission Standard for Cable Television*, DVS-031 Rev. 2, Society of Cable Telecommunications Engineers, May 1997 (SCTE DVS-031) and ITU-T Recommendation J.83 Annex B, April 1997 (ITU-T J.83B) are used. In particular, SCTE DVS-031 describes the adopted standard for digital cable in the U.S. When a digital signal is encoded using one or a similar standard as cited above, a Forward Error Correction (FEC) stage at the transmitter end is used for encoding the digital signal. Within the FEC stage, the digital signal is generally subjected to a convolutional interleaving operation that may occur between a Reed-Solomon (RS) block coding operation and a randomizer operation, as in the U.S. digital cable standard. The FEC stage helps enable the correction of random and burst mode induced errors when the encoded digital signal is modulated and transmitted through a communication channel such as the terrestrial airwaves or cable.

When performing an interleaving encoding operation, an interleaving mode may be selected from several interleaving modes, each mode representing a different process for interleaving a digital signal. When the encoded digital signal is transmitted and eventually received at a receiver, identification information (i.e., a control word) embedded in the received signal identifies the interleaving mode used to encode the digital signal. As in the U.S. digital cable standard, such identification information may be located within frame synchronization sequence trailers that delineate FEC frames contained within the encoded digital signal.

In an environment where a received digital signal is subjected to noise, the accurate identification of a selected interleaving mode becomes difficult. This problem is especially true in low signal to noise ratio (SNR) environments where the determination of a selected interleaving mode becomes very unreliable due to the presence of noise.

SUMMARY OF THE INVENTION

The problems stated above, as well as other related problems of the prior art, are solved by the present invention by utilizing a robust detector for identifying the interleaving mode used for encoding a digital signal.

According to an aspect of the present invention a control word detection method is disclosed for detecting control words that correspond to a selected encoding operation used to encode data from a digital signal. The method includes an operation of extracting a control word from each received frame packet from the digital signal and determining whether a number of extracted control words are identical. If identical, a decoder is caused to decode data in an operating mode that corresponds to the identical control words.

These and other aspects, features and advantages of the present invention will become apparent from the following detailed description of preferred embodiments, which is to be read in connection with the accompanying drawings.

DETAILED DESCRIPTION OF THE INVENTION

The principles of detecting the interleaving mode used for encoding a digital signal apply to any type of modality such as satellite, cable, telephone, over the air, and the like, that is used for transmitting digital signals. In several of the exemplary embodiments of the invention described below, the SCTE DVS-031 and ITU-T J.83B cable standards are used to describe the operation of the invention. It is to be understood that the principles detailed in such exemplary embodiments are applicable to other transmission standards and transmission modalities.

Figure 1:
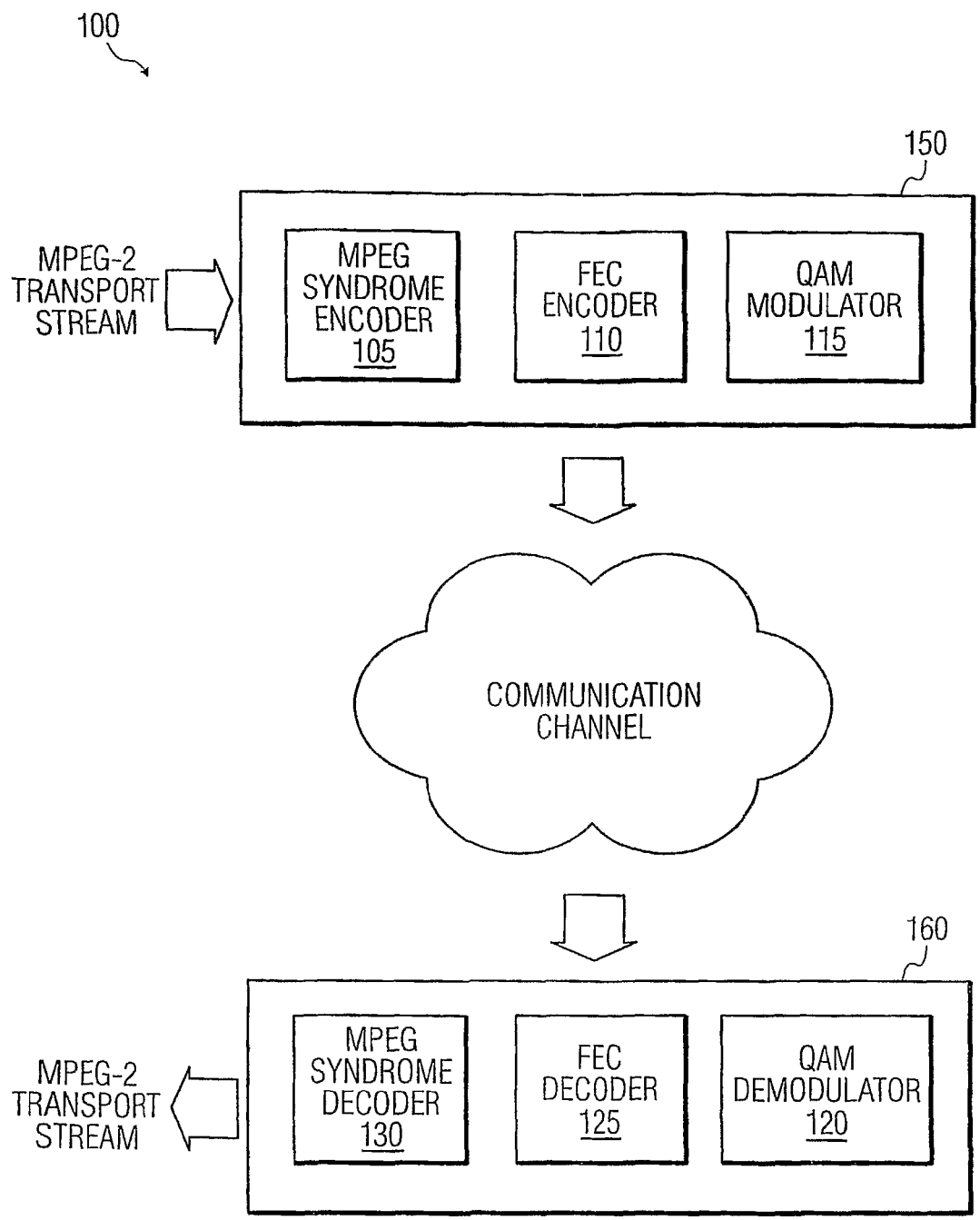
FIG. 1 is a schematic diagram illustrating an exemplary cable transmission system, according to an illustrative embodiment of the present invention.

FIG. 1 discloses an exemplary embodiment of a cable transmission system 100. Digital information, which may comprise video, audio, data services, and like, as part of an MPEG-2 based transport stream is presented to MPEG syndrome encoder 105, as the input stage of encoder 150. The MPEG-2 transport stream encompasses digital information in the form of packets having a size of 188 bytes, with the first byte of each packet being used for synchronization purposes, three bytes (in the packet header) being used for service information, encryption, and control information, and the other 184 bytes representing the payload of the packet. The digital information is stored within the payload of such packets.

Figure 2:
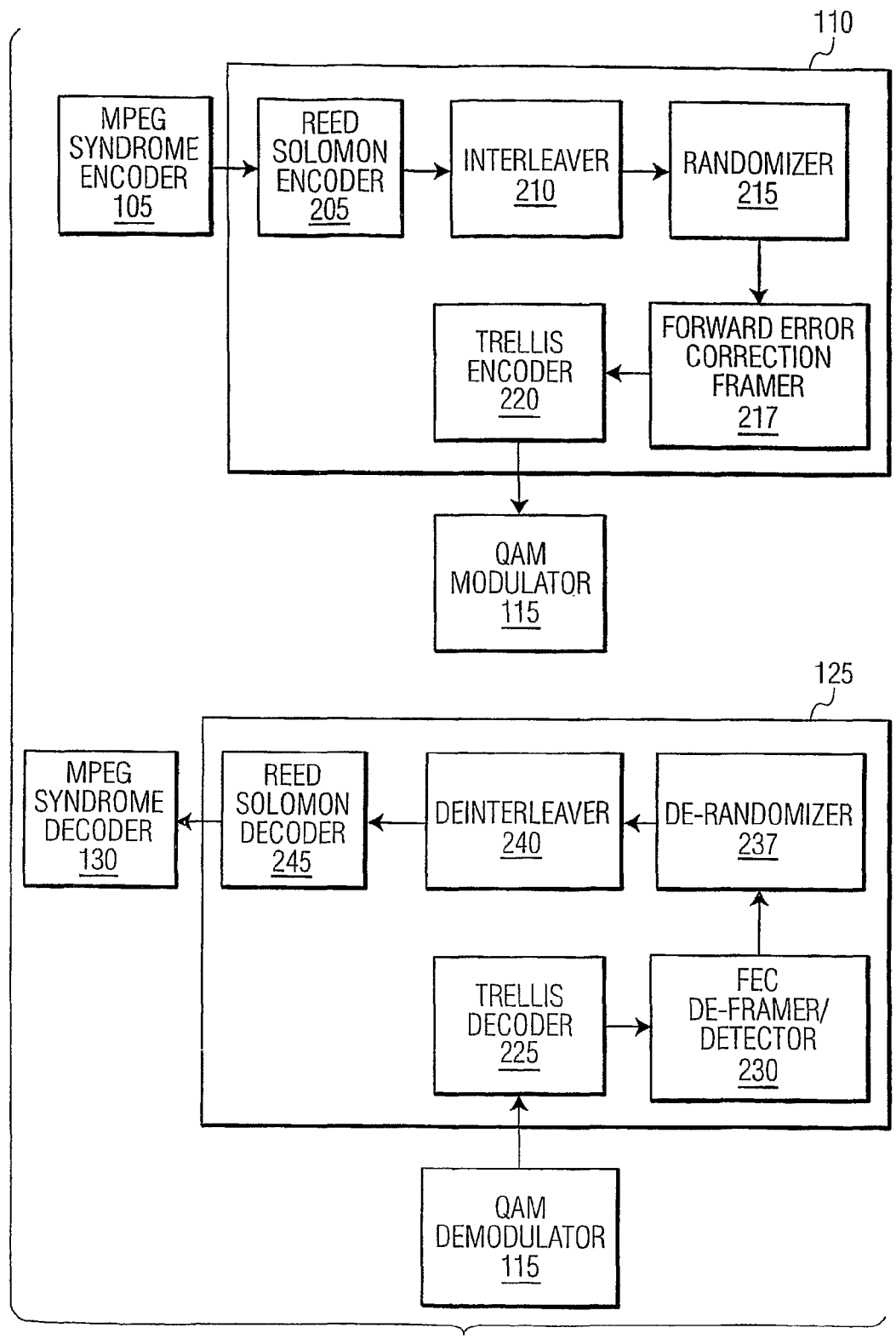
FIG. 2 is a schematic diagram illustrating an exemplary Forward Error Correction (FEC) encoder and decoder according to an illustrative embodiment of the present invention.

Typically, the synchronization byte has a value of 47 Hex when in the form of a MPEG-2 transport packet. When the packet is however presented to MPEG syndrome encoder 105, the sync byte is removed and replaced with information representing a parity checksum of the previous 187 bytes. Specifically, the checksum value is a coset of a Finite Impulse Response (FIR) parity check linear block code. The replacement of the sync byte helps supply improved packet delineation functionality and an error detection capability that is independent of the FEC operation that occurs in FEC encoder 110. The computation of the parity checksum is calculated as detailed in ITU-T J.83B standard or as known in the art FEC encoder 110 receives MPEG-2 packets with replaced checksum value from MPEG syndrome encoder 105. FEC encoder 110 uses a concatenated coding approach of four different layers, as shown in FIG. 2, for encoding the received MPEG-2 packets into a signal capable of being modulated by Quadrature Amplitude Modulation (QAM) modulator 115. Reed Solomon Encoder 205, as the first layer, uses a Reed Solomon (RS) based (128,122) code over a Galois Field (128) that is capable of correcting up to three symbol errors per RS block. Interleaver 210, as the second layer, applies a convolutional interleaving technique to interleave the data received from Reed Solomon Encoder 205 before the interleaved data is applied to Randomizer 215.

The operation of FEC encoder 110 generates packets called frame packets based on the modulation scheme used by Quadrature Amplitude Modulation QAM modulator 115. The composition of a generated frame packet is composed of Reed Solomon blocks that are received from Reed Solomon Encoder 205. Each RS block contains 128 data and parity symbols where each symbol consists of 7 bits. A generated frame packet, when modulated by a 64-point signal constellation (64 QAM) technique, contains 60 RS blocks or 88 RS blocks for a 256-point signal constellation QAM modulated signal. The frame packet also has a frame sequence synchronization trailer (at the end of the frame packet) of 42 bits when 64 QAM modulated or 40 bits when 256 QAM modulated.

The first 4 7-bit symbols (28 bits) of a frame sync trailer for a frame packet subjected to 64 QAM modulation represent a unique synchronization pattern. The remaining 2 symbols (14 bits) of the frame packet are used where the first 4 bits represent a code corresponding to the interleaver mode control and the last 10 bits are reserved and set to zero. Similarly, the first 32 bits of the 40 bits of a frame sync trailer for a frame packet subjected to 256 QAM modulation also represent a unique synchronization pattern. The next 4 bits of the frame packet are used to represent a code correspond to the interleaver mode control and the last 4 bits are a reserved word.

The values that are used for the code corresponding to the interleaver control mode, representing a control word, are shown in Table 1. The value I represents the number of taps or registers used for the interleaving process. The J value represents the increment size of each additional register used during the interleaving process.

TABLE 1

| CONTROL WORD | I = # OF TAPS | J = INCREMENT |
| --- | --- | --- |
| 0000 | 128 | 1 |
| 0001 | 128 | 1 |
| 0010 | 128 | 2 |
| 0011 | 64 | 2 |
| 0100 | 128 | 3 |
| 0101 | 32 | 4 |
| 0110 | 128 | 4 |
| 0111 | 16 | 8 |
| 1000** | 128 | 5 |
| 1001 | 8 | 16 |
| 1010** | 128 | 6 |
| 1011 | Reserved | Reserved |
| 1100** | 128 | 7 |
| 1101 | Reserved | Reserved |
| 1110** | 128 | 8 |
| 1111 | Reserved | Reserved |

**Modes not Present in the DVS-031 standard

Figure 3:
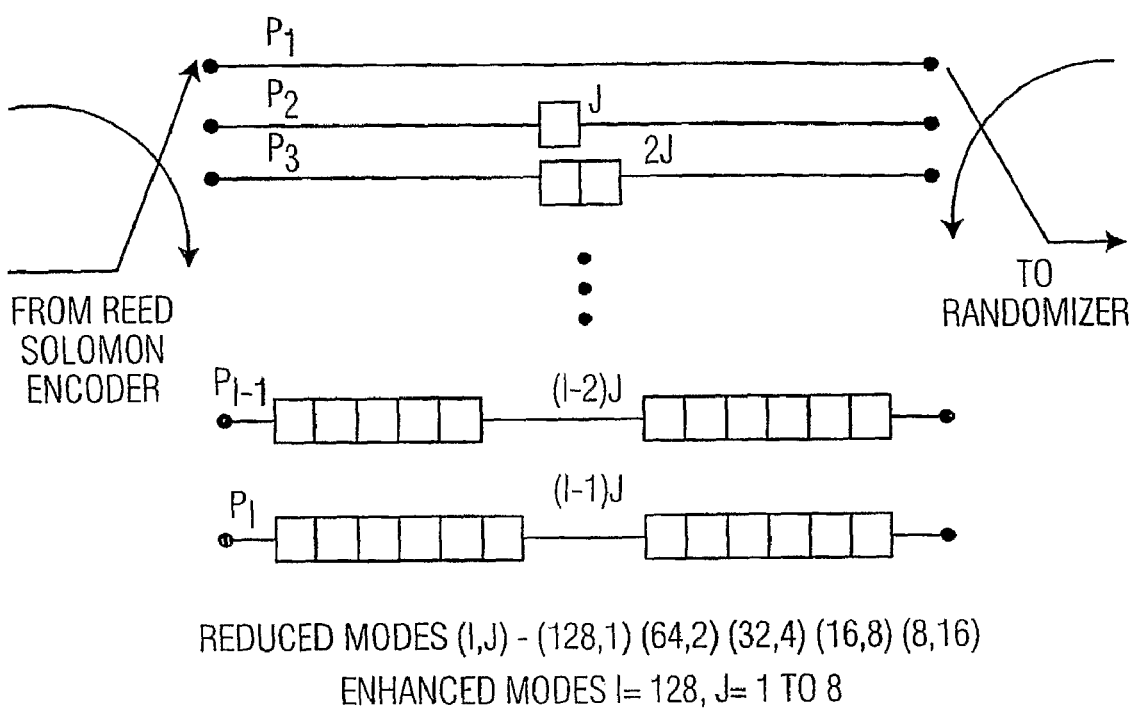
FIG. 3 is a schematic diagram of an interleaving encoding operation used to generate a digital signal, according to an illustrative embodiment of the present invention.

FIG. 3 illustrates an exemplary interleaving operation. Initially, interleaving encoding begins with a theoretical commutator being initialized to a top most branch ($P_1$) where the commutator increments at the Reed Solomon symbol frequency, with a single symbol output being outputted from each path (as there are 7 bits per symbol, as stated above). During the convolutional interleaving operation, the RS code symbols from Reed Solomon encoder 205 are sequentially shifted into the bank of I registers. Each successive register has J symbols more storage than the preceding register. Hence, the first interleaver path ($P_1$) has zero delay, the second interleaver path ($P_2$) has a J symbol delay, and the third interleaver path ($P_3$) has a 2*J symbol delay, and so on, until the last path ($P_I$) which has an (I-1)*J symbol delay.

When the interleaved data is eventually modulated and transmitted to a receiver, a deinterleaver (in the receiver) must account for the net delay for each RS symbol that was used while the data was first interleaved. In addition, burst noise in a transmission channel may cause contiguous bad symbols to be received at the receiver. By matching the net delay to the original interleaving process, a deinterleaver can spread these symbol errors over many RS blocks so the resultant symbol errors per block are within the range of the RS decoder correction capability.

In regards to the interleaving capability of the exemplary embodiment, there are two mode levels specified for the SCTE DVS-031 and ITU-T J.B83 standards. Level 1 interleaving, which is used for data modulated using a 64 QAM using values of I=128 and J=1. Typically Level 1 is used for legacy based digital set top boxes and televisions. The reserved 4 bits of an FEC frame packet typically used for designating a control word corresponding to a selected interleaving mode are disregarded in this level.

Level 2 interleaving, as shown in Table 1, has a variety of enlarged and reduced interleaving depths relative to the nominal level 1 configuration. In addition, Level 2 interleaving pertains to both 64 QAM and 256 QAM based modulations. As shown in Table 1, odd based control words correspond to reduced interleaving modes and even numbered control words correspond to enhanced interleaving modes. Such terms and concepts are known in the art.

Once data is interleaved, the resulting data is supplied to randomizer 215, as the third layer of the FEC encoding operation. Randomizer 215 evenly distributes symbols in a constellation for transmission. Evenly distributed data helps the receiver that will eventually demodulate encoded data maintain a proper lock on the received data. Randomizer 215 adds a pseudorandom noise sequence of 7 bits over a GF (128) to the data symbols in a FEC frame resulting in a randomly transmitted sequence.

The randomization operation of randomizer 215 occurs in conjunction with the operation of FEC framer 217 to produce FEC frames composed of RS blocks and a frame sync trailer, as described above. Importantly, when either 64 QAM or 256 QAM modulation is used for transmitting data, randomizer 215 is initialized during the FEC frame trailer and is then enabled at the first symbol after the trailer. Hence, the trailer itself should not be randomized but the RS block information is randomized.

Trellis encoder 220, as the fourth and final layer of the encoding process, receives the FEC frames from FEC framer 217 and performs a convolutional coding operation. At this point, either 64 QAM or 256 QAM modulation is performed on the FEC encoded data by QAM encoder 115 as described in ITU-T J.B83 standard or as known in the art. The QAM modulated data is then capable of being transmitted through a communication channel by transmitter 150.

The operation of receiver 160 in FIG. 1 performs the inverse operations of transmitter 150, as described above. Receiver 160 receives a modulated signal through a communication channel and performs a demodulation operation using QAM demodulator 120. The demodulated data is then decoded by FEC decoder 125, where receiver 160 uses the FEC frame sync of a decoded FEC frame to determine the interleaving mode corresponding to an interleaving mode-control word used to interleave such data, as listed in Table 1.

As shown in FIG. 2, before the extraction of the control word, the encoded data is decoded by trellis decoder 225 that converts the trellis coded data into decoded data by performing an inverse operation of trellis encoding, as known in the art. The resulting trellis decoded frames are then supplied to the FEC de-framer 230 which detects the frame sync and delivers the payload to the de-randomizer 237 that orders the data into interleaved RS encoded blocks; the encoding format of such blocks before the encoded data was randomized.

While the data being processed by FEC de-framer 230, the FEC frame sync of the frame is detected and read to determine the interleaving mode used to interleave the contents of the FEC frame before the data was transmitted.

Specifically, FEC de-framer 230 extracts an interleaver mode control word, as shown in Table 1, from the FEC frame. After such an extraction, deinterleaver 140 is set to a deinterleaving mode using I and J values that correspond to the interleaver mode control mode. Using these values, the deinterleaved data is deinterleaved back into RS encoded blocks by deinterleaver 240. These blocks are then presented to Reed Solomon decoder 245 that decodes the RS encoded blocks back into data for processing by MPEG syndrome decoder 130, which constitutes the received data into MPEG-2 based transport packets. The operation of the FEC decoder 125 and MPEG syndrome decoder 130 is known in the art.

In the presence of noise however, the identification of the interleaver mode control word becomes difficult by the FEC de-framer 230. Specifically, the FEC frame sync is only subject to trellis encoding, which does not strongly protect the FEC frame sync against noise, unlike the payload of a FEC frame packet.

Figure 4:
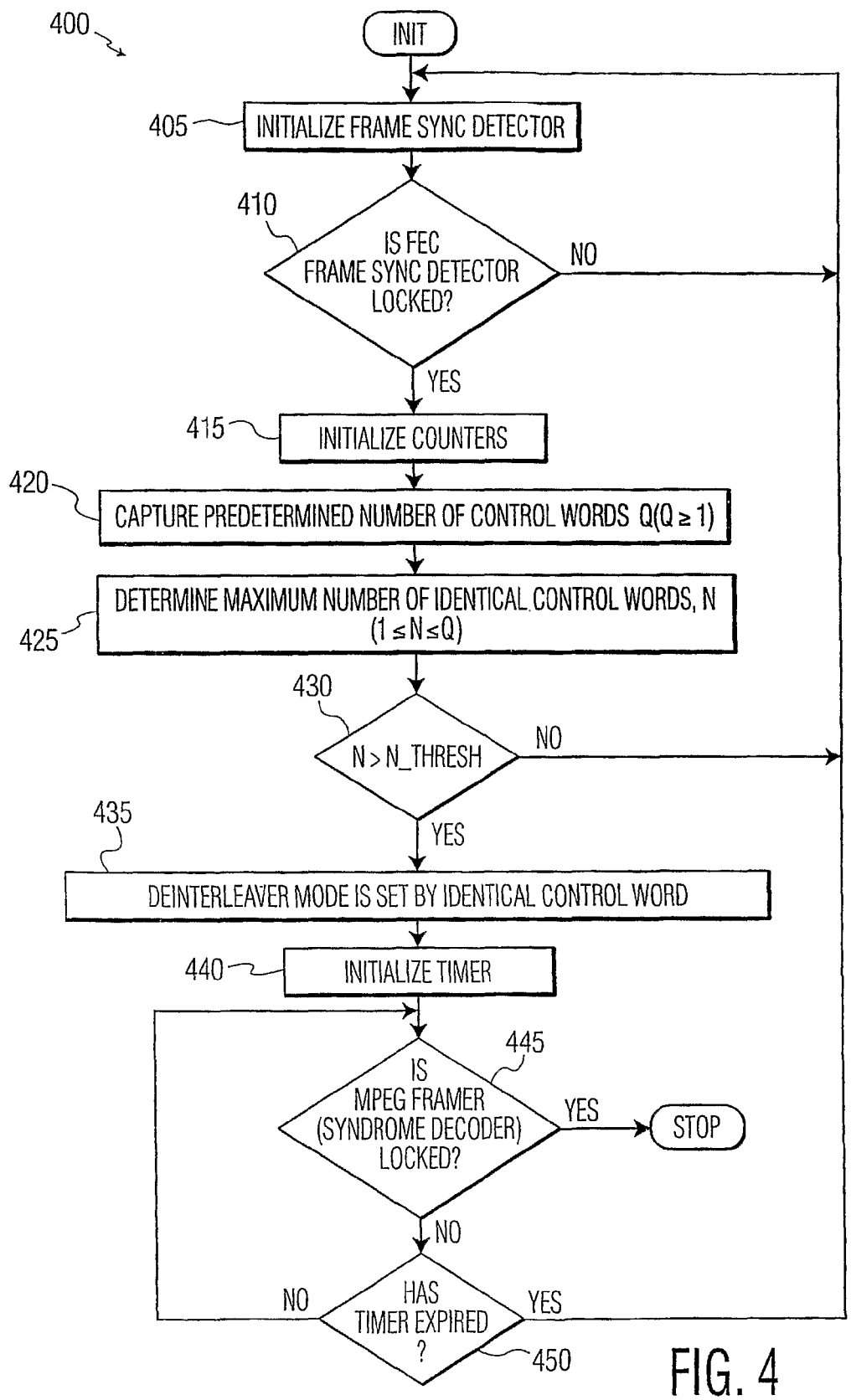
FIG. 4 is a diagram illustrating an exemplary method for determining the control code word used to encode received data, according to an illustrative embodiment of the present invention.

To enhance the effectiveness of a receiver 160 to extract the information corresponding to the interleaver mode control word, a method 400 for interleaver control word detection, as shown in FIG. 4, is disclosed. In step 405, a frame sync detector (of FEC de-framer 230) is initialized. After the initialization step, data coming from trellis decoder 225 is inputted into de-framer 230 that detects a FEC frame sync lock (step 410). A FEC frame sync lock basically means that de-framer 230 locks on to the frame sync trailer of a received FEC frame packet. Once a lock is established, de-framer 230 begins to capture a set number of words (Q, Q≧1) at a time, where the captured words are preferably from consecutive frames (step 420). If the decoding system is unable to detect a frame sync lock, then steps 405 and 410 are repeated until the frame sync lock is reached.

Before the de-framer 230 captures the received FEC frames, de-framer 230 initializes two memory counters (step 415). One of the counters is used to count the total number of captured interleaver mode control words from successive FEC frames. The second counter is used for counting the maximum number of identical interleaver mode control words that are captured. It is noted that the first and second memory counters may be a combination of memory registers or software that reside in de-framer 230, FEC decoder 125, or a memory location in receiver 160, and the like.

In an optional embodiment of the present invention, the second counter is programmed to count the maximum number of identical interleaver mode control words that are captured. This is to account for the case where several different sets of identical interleaver control words are captured (for example, one set with a control word of 0000 and one set with a control word of 0001). By programming the second counter to keep track of the maximum number of identical interleaver control words, the control word corresponding to the set with the largest quantity of control words is the interleaver control word selected for the following steps of the invention.

The operation of the first counter is utilized in step 420 where the counter is incremented until a predetermined or programmable number Q (Q≧1) of successive control words from successive FEC frames are captured. Once the first counter achieves the value Q, the second memory counter value N (1≦N≦Q) at the time is determined in step 425. Step 430 is implemented by comparing the value in the second counter to a threshold value, N_THRESH (1≦N_THRESH≦Q). If the value of the second counter is higher than the threshold value, then it is likely that the identical interleaver mode control words being counted by the second counter are correct. When the value of the second counter is higher then the threshold value, receiver 160 proceeds with step 435. If the value of the second counter is not higher than a threshold number then the system returns to step 405 and the de-framer 317 is re-initialized.

In an optional embodiment of the present invention, step 425 calculates the maximum number of identical control words for each increment on the total number of control words in step 420. Step 430 is repeated until N>N_TRESH or the value of the first counter reaches a predetermined or programmable value. At this stage, if the value corresponding to the second counter still does not exceed the threshold value, the system then reinitializes the frame sync detector, as in step 405, and repeats method 400.

In step 435 the system sets deinterleaver 240 into the deinterleaver mode that corresponds to the identical control word. Deinterleaver 240 then deinterleaves data received from derandomizer 237 into RS blocks for decoding by Reed Solomon decoder 245. After the RS blocks are decoded, the resulting data is capable of being framed into MPEG-2 transport packets by MPEG syndrome decoder 130.

In step 445, the system determines whether an MPEG syndrome decoder lock is established via an MPEG syndrome flag. It decodes the parity check block code inside the MPEG syndrome decoder 130 in order to recover the MPEG sync-byte and lock to it. MPEG syndrome decoder 130 is set up to detect an MPEG syndrome flag in the location of an MPEG packet that replaced the sync byte of a typical MPEG transport packet. If a lock is established, MPEG syndrome decoder 130 converts the FEC decoded data into MPEG-2 transport packets for use by receiver 160 or to an external device depending on a desired application. If no lock established in step 445, the system waits for a period of time in step 450. Once the timer expires the system will reset and repeat the step of detecting a FEC frame sync lock (as in step 410).

Principles of the present invention may be modified to cover different types of circumstances involving different modulation schemes such as QAM, VSB, QPSK, OFDM, physical and transport packet standards, or any type of video, audio, and information data. Such variations are contemplated in view of the teachings of the present invention. The principles of the present invention may also be applied to any type of transmission/receiver type of modality requiring that a decoding mode be selected in view of information that is received from a data transmission.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A method for determining the operating mode used for decoding received packetized data comprising the steps of:
    a) receiving a plurality of data packets, wherein each data packet has a control word;
    b) extracting the control word from each packet as to capture a plurality of control words;
    c) determining that a number of control words from said plurality of control words are identical;
    d) using said control word to set a decoder operating mode when said determined number of identical control words is above a threshold number.

2. The method of claim 1, wherein said operating mode is a deinterleaving mode selected from a plurality of deinterleaving modes.

3. The method of claim 2, where said plurality of deinterleaving modes are compliant with the deinterleaving modes disclosed in at least one of: DVS-031 and ITU-T J.83B.

4. The method of claim 2, wherein said method is used for a receiver capable of demodulating a signal modulated in at least one of: QAM, VSB, QPSK and OFDM.

5. The method of claim 1, comprising an additional step of:
    e) detecting an MPEG syndrome lock.
    f) restarting the reception of the plurality of data packets if an MPEG syndrome lock is not detected within a time period.

6. The method of claim 5 wherein the MPEG syndrome lock results from syndrome decoding in the MPEG framer conformant with at least one of: DVS-031 and ITU-T J.83B.

7. The method of claim 1, wherein said number of control words is a maximum number of control words that are identical when at least two different sets of identical control words are received.

8. The method of claim 1, wherein said extracting step is preceded with a detection of a forward error correction frame sync lock.

9. The method of claim 8, wherein said packets are a plurality of forward error correction frames where each frame has a corresponding frame sync trailer.

10. A method for determining a deinterleaver operating mode used by a receiver to decode received digital data comprising the steps of:
    a) initializing a frame sync detector;
    b) detecting a forward error correction sync lock from a received forward error correction frame using a frame sync trailer that corresponds to said frame;
    c) capturing a plurality of control words from a plurality of forward error correction frames wherein each frame has a corresponding control word;
    d) determining that a number of control words from said plurality of control words are identical control words and said determined number of identical control words is above a threshold number;
    e) using said identical control word to set a deinterleaver mode selected from a plurality of deinterleaver modes upon determining said determined number of identical control words is above the threshold number.

11. The method of claim 10, comprising an additional step of:
    f) deinterleaving said received plurality of forward error correction frames using said selected deinterleaver mode.

12. The method of claim 10, wherein an MPEG syndrome decoder lock is detected after selecting said deinterleaver mode step is performed.

13. The method of claim 12, wherein said method is re-initialized after a predetermined duration of time if an MPEG syndrome decoder lock is not detected.

14. The method of claim 12 wherein the MPEG syndrome lock results from syndrome decoding in the MPEG framer conformant with at least one of: DVS-031 and ITU-T J.83B.

15. The method of claim 10, wherein said method is used for a receiver capable of demodulating a signal modulated in at least one of: QAM, VSB, QPSK, and OFDM.

16. The method of claim 10, where said plurality of deinterleaving modes are compliant with the deinterleaving modes disclosed in at least one of: DVS-031 and ITU-T J.83B.

17. The method of claim 10, wherein said number of control words is a maximum amount of control words that are compared to said threshold number when at least two different sets of identical control words are received.

* * * * *